(12) United States Patent
Campanella et al.

(10) Patent No.: US 12,198,336 B2
(45) Date of Patent: Jan. 14, 2025

(54) FAST WHOLE SLIDE TISSUE TILING METHOD

(71) Applicant: MEMORIAL SLOAN KETTERING CANCER CENTER, New York, NY (US)

(72) Inventors: Gabriele Campanella, New York, NY (US); Thomas Fuchs, New York, NY (US)

(73) Assignee: Memorial Sloan-Kettering Cancer Center, New York, NY (US)

( * ) Notice: Subject to any disclaimer, the term of this patent is extended or adjusted under 35 U.S.C. 154(b) by 390 days.

(21) Appl. No.: 17/636,969

(22) PCT Filed: Aug. 24, 2020

(86) PCT No.: PCT/US2020/047681
§ 371 (c)(1),
(2) Date: Feb. 21, 2022

(87) PCT Pub. No.: WO2021/041340
PCT Pub. Date: Mar. 4, 2021

(65) Prior Publication Data
US 2022/0292681 A1    Sep. 15, 2022

Related U.S. Application Data

(60) Provisional application No. 62/890,851, filed on Aug. 23, 2019.

(51) Int. Cl.
*G06T 7/00* (2017.01)
*G01N 1/28* (2006.01)
(Continued)

(52) U.S. Cl.
CPC ......... *G06T 7/0012* (2013.01); *G01N 1/2813* (2013.01); *G06T 3/40* (2013.01);
(Continued)

(58) Field of Classification Search
None
See application file for complete search history.

(56) References Cited

U.S. PATENT DOCUMENTS 10,248,663 B1    4/2019    Keisler et al.
2005/0266395 A1    12/2005    Gholap et al.
(Continued)

OTHER PUBLICATIONS

International Search Report and Written Opinion of the International Searching Authority issued in PCT Application No. PCT/US2020/047681, mailed Nov. 20, 2020.

*Primary Examiner* — Leon Flores
(74) *Attorney, Agent, or Firm* — Bookoff McAndrews, PLLC

(57) ABSTRACT

The present application relates generally to image tiling, including but not limited to systems and methods of fast whole slide tissue tiling. A computing system may identify a first image of a first dimension from which to select one or more tiles. The computing system may perform a reduction operation on the first image to generate a second image of a second dimension. The computing system may apply a thresholding operation on the second image to identify a first set of pixels corresponding to the presence of the feature and a second set of pixels corresponding to the absence of the feature based on an intensity of each pixel in the second image. The computing system may select, from a plurality of tiles corresponding to the first image, a subset of tiles corresponding to the first set of pixels identified from the second image.

20 Claims, 5 Drawing Sheets

(51) Int. Cl.
  *G06T 3/40* (2006.01)
  *G06T 5/50* (2006.01)
  *G06T 5/70* (2024.01)
  *G06T 7/11* (2017.01)
  *G06T 7/174* (2017.01)
  *G06V 10/20* (2022.01)
  *G06V 20/69* (2022.01)

(52) U.S. Cl.
  CPC ................. *G06T 5/50* (2013.01); *G06T 5/70* (2024.01); *G06T 7/0014* (2013.01); *G06T 7/11* (2017.01); *G06T 7/174* (2017.01); *G06V 10/20* (2022.01); *G06V 20/69* (2022.01); *G01N 2001/282* (2013.01); *G06T 2207/10024* (2013.01); *G06T 2207/10056* (2013.01); *G06T 2207/20021* (2013.01); *G06T 2207/30024* (2013.01)

(56) References Cited

U.S. PATENT DOCUMENTS

2018/0365824 A1   12/2018  Yuh et al.
2021/0271847 A1*  9/2021   Courtiol ............... G06V 20/698

* cited by examiner

FAST WHOLE SLIDE TISSUE TILING METHOD

CROSS-REFERENCE TO RELATED APPLICATIONS

The present application is a U.S. National Phase Application under 35 U.S.C. § 371 of International Application No. PCT/US2020/047681, filed Aug. 24, 2020, which claims priority to and the benefit of U.S. Provisional Application No. 62/890,851, filed Aug. 23, 2019, each of which is incorporated herein by reference in its entirety.

TECHNICAL FIELD

The present application relates generally to image tiling, including but not limited to systems and methods of fast whole slide tissue tiling.

BACKGROUND

A computing device may employ computer vision techniques to analyze different images. In analyzing the images, the computing device may rely on any number of factors to perform the analysis.

SUMMARY

At least one aspect of the present disclosure is directed to systems and methods for fast whole slide tissue tiling. A computing system may identify a first image of a first dimension from which to select one or more tiles. The first image may have a first area corresponding to a presence of a feature and a second area corresponding to an absence of the feature. The computing system may perform a reduction operation on the first image to generate a second image of a second dimension. The second dimension may be less than the first dimension. The computing system may apply a thresholding operation on the second image to identify a first set of pixels corresponding to the presence of the feature and a second set of pixels corresponding to the absence of the feature based on an intensity of each pixel in the second image. The computing system may select, from a plurality of tiles corresponding to the first image, a subset of tiles corresponding to the first set of pixels identified from the second image. The computing system may store, in one or more data structures, an association between the first image and the subset of tiles.

In some embodiments, the computing system may receive a request for tiles from the first image to be used for additional processing. The computing system may provide, responsive to the request, the subset of tiles selected from the plurality of tiles for the first image. In some embodiments, the computer system may remove, prior to applying the thresholding operation, a visual mark in at least one of the first image or the second image based on at least one of a color characteristic of the visual mark or an area of the visual mark.

In some embodiments, the computer system may perform, a smoothening operation on the second image to reduce or eliminate at least one visual artefact from the second image, prior to applying the thresholding operation. In some embodiments, the computer system may identify a plurality of tiles from the first image at a defined step size. Each tile of the plurality of tiles may correspond to a respective portion of the first image. Each tile of the subset of tiles may correspond to one or more respective pixels of the first set of pixels in the second image.

In some embodiments, the computer system may apply a discretization operation to a third image generated from applying the threshold operation on the second image. The third image may have the first set of pixels corresponding to the presence of the feature and the second set of pixels corresponding to the absence of the feature. In some embodiments, applying the thresholding operation can include generating a third image using the second image in accordance with the thresholding operation. The third image can have the first set of pixels each set to a first value to indicate the presence of the feature. The third image can also have the second set of pixels each set to a second value to indicate an absence of the feature.

In some embodiments, selecting the subset of tiles can include determining, for each tile of the subset of tiles, a mapping between one or more respective pixels of the first set of pixels identified from the second image to a respective portion in the first image based on the reduction operation used to generate the second image. In some embodiments, selecting the subset of tiles can include identifying, for each of the subset of tiles, a corresponding set of coordinates defining a respective portion in the first image. Storing the association can also include storing, in the one or more data structures, the association between the first image with the corresponding set of coordinates for each the subset of tiles.

In some embodiments, the first image is derived from a tissue sample via a histopathological image prepare. The feature can correspond to the tissue sample. The first image can have the first area correspond to a presence of the tissue sample and a second area correspond to an absence of the tissue sample.

BRIEF DESCRIPTION OF DRAWINGS

The objects, aspects, features, and advantages of the disclosure will become more apparent and better understood by referring to the following description taken in conjunction with the accompanying drawing, in which.

DETAILED DESCRIPTION

Following below are more detailed descriptions of various concepts related to, and embodiments of, systems and methods for fast tile extraction. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes systems and methods for fast tile extraction from images.

Section B describes a network environment and computing environment which may be useful for practicing various embodiments described herein.

A. Systems and Methods for Fast Tile Extraction from Images

Applying machine learning to whole slides often requires breaking them into smaller tiles. It is often necessary to avoid tiles containing no tissue (background tiles). The method here proposed can create a list of coordinates for all the tiles containing tissue in a whole slide. It can do so at different magnifications and with overlap and it is much faster than other methods. The standard approach is to consider each tile in a whole slide independently. That requires reading the pixels of all the possible tiles in a slide. Especially at high magnification and with overlap it becomes extremely slow to do so.

Disclosed herein, instead of reading pixels at high resolution, the present systems and methods can down-sample the whole slide to a thumbnail in such a way that each pixel in the thumbnail corresponds to a full tile at the desired magnification level. Determining foreground tiles becomes trivial as a simple thresholding method such as the "Otsu" method can be applied to binarize the thumbnail. Additional steps can be included to remove small spots of dirt, pen marks and so on. To generate the list of coordinates for the tissue tile in the whole slide simply involves rescaling and shifting appropriately the index pixels of the binarized thumbnail. Such method can generate tile coordinate lists several orders of magnitude faster than other methods and is an essential first step in most computational pathology pipelines.

Figure 1:
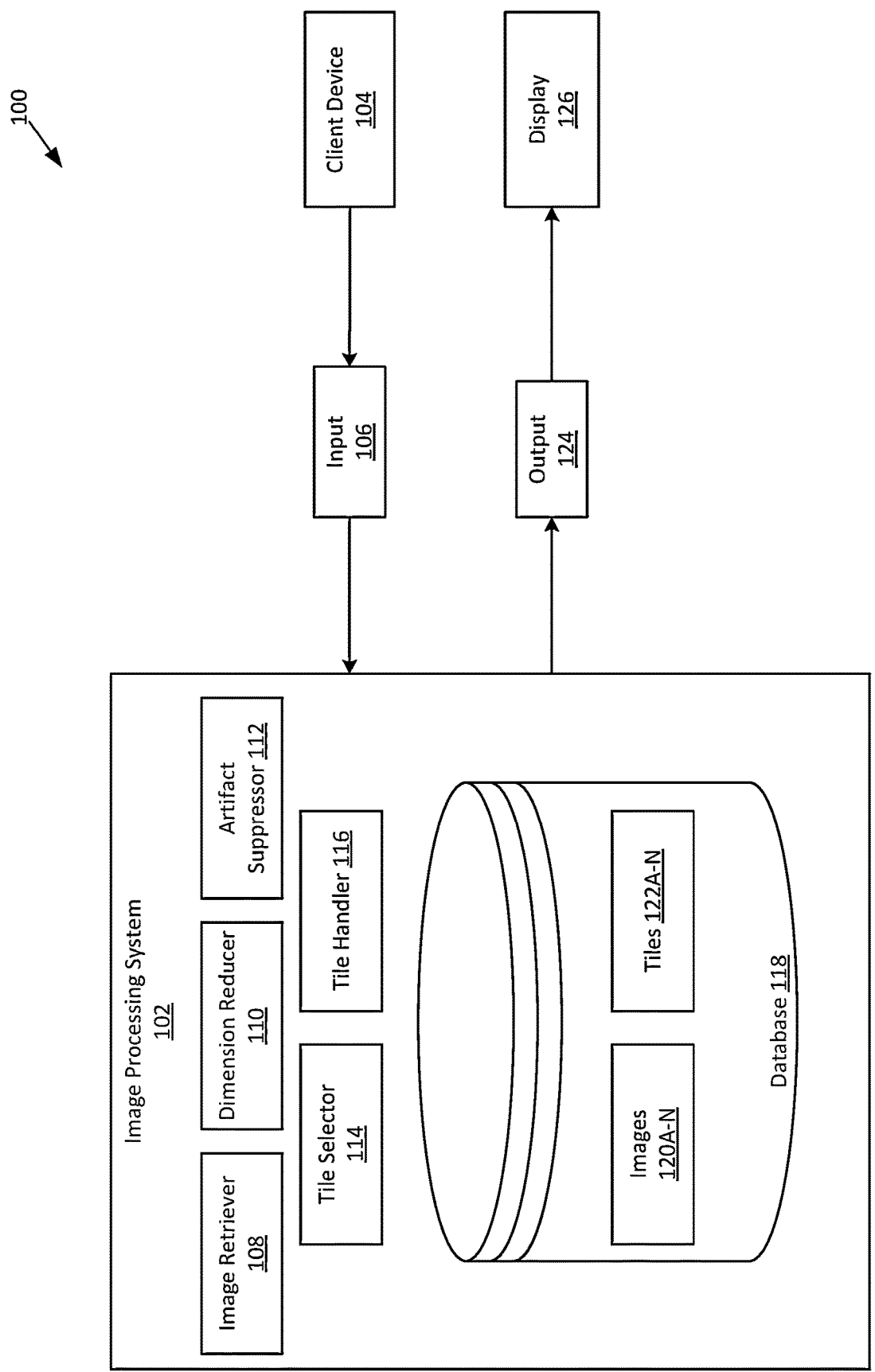
FIG. 1 is depicts a block diagram of a system for fast whole slide tissue tiling.

Referring now to FIG. 1, depicted is a block diagram of a system for fast whole slide tissue tiling. In brief overview, the system 100 may include at least one image processing system 102 (sometimes generally referred to as a computing system), at least one client device 104, and at least one display 126, among others. The client device 104, the image retrieval system 102, and the display 126 may be communicatively coupled to one another. The image retrieval system 102 may include at least one input 106, at least one image retriever 108, at least one dimension reducer 110, at least one artifact suppressor 112, at least one tile selector 114, at least one tile handler 116, at least one database 118, and at least one output 124, among others. The at least one input 106 can receive an image 120'. The at least one output 124 can output at least one image 120". The at least one database 118 may include or maintain a plurality of images 120A-N (hereinafter generally referred to as query images 120) and a plurality of tiles 122A-N (hereinafter generally referred to as tiles 122), among others. Each of the components in the system 100 listed above may be implemented using hardware (e.g., one or more processors coupled with memory) or a combination of hardware and software as detailed herein in Section B. Each of the components in the system 100 may implement or execute the functionalities detailed herein, such as those described in Section A.

The image retriever 108 may receive, retrieve, or otherwise identify at least one input 106. The input 106 may include the image 120. In some embodiments, the input 106 includes a request for tiles 122 from the image 120 to be used for additional processing. For instance, the image processing system 102 can receive the request from the client device 104. In some embodiments, the image retriever 108 may receive the image 120' from the client device 104. In some embodiments, the image retriever 108 may receive the image 120' from the database 118. The client device 104 can request an image segmentation analysis, feature detection, classification, or any other analysis of the image 120'.

In general, the image 120' can be any digital image comprised picture elements such as pixels. In some embodiments, the image 120' can be derived from a tissue sample. The client device 104 can be a histopathological image preparer that provides the image 120'. The image 120' can be composed of pixels. For instance, the image 120' can be in the range of megapixels or gigapixels. The image 120' can also be a biomedical image, which may be acquired in accordance with microscopy techniques or a histopathological image preparer, such as using an optical microscope, a confocal microscope, a fluorescence microscope, a phosphorescence microscope, an electron microscope, among others. The image 120' may be, for example, a histological section with a hematoxylin and eosin (H&E) stain, hemosiderin stain, a Sudan stain, a Schiff stain, a Congo red stain, a Gram stain, a Ziehl-Neelsen stain, a Auramine-rhodamine stain, a trichrome stain, a Silver stain, and Wright's Stain, among others. The biomedical image for the image 120' may be from a tissue section from a subject (e.g., human, animal, or plant) for performing histopathological surveys. The tissue sample may be from any part of the subject, such as a muscle tissue, a connective tissue, an epithelial tissue, or a nervous tissue in the case of a human or animal subject. For instance, the image 120' may be an instance of the architecture detailed herein in conjunction with FIGS. 1-3.

Figure 2:
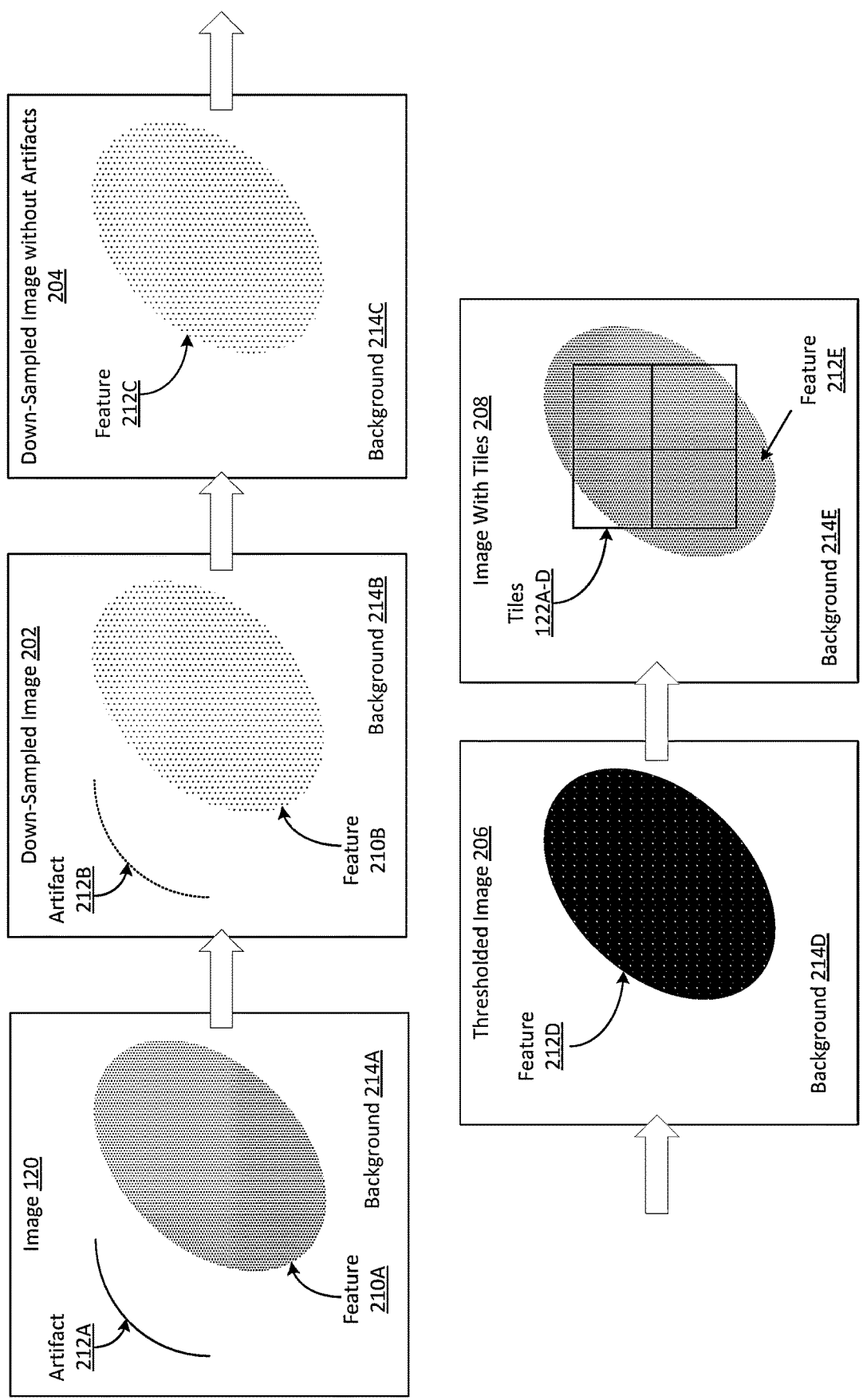
FIG. 2 depicts a block diagram illustrating extraction of tiles from an image.

Now referring to FIG. 2, depicted is the image 120 in the image processing system 102. In overview, a down-sampled image 202 may be generated by the dimension reducer 110 via down sampling from the image 120. A down-sampled image without artifacts 212 may be generated by the artifact suppressor 112 suppressing artifacts from the down-sampled image 202. A thresholded image 206 may be generated by the tile selector 114 applying a thresholding operation to the down-sampled image without artifacts 212. An original tile with tiles 208 may be generated by the tile handler 116 by matching the tiles from the thresholded image 206 to the image 120. The image 120' can have features 210A-E (hereinafter generally referred to as feature 210). The feature 210A can correspond to the tissue sample. The image 120' can have artifacts 212-B (hereinafter generally referred to as artifact 212). The artifact 212 can be an anomaly in the image 120. The image 120' can have background 214A-E (hereinafter generally referred to as background 214). The background 214 can represent the portion of the image without a feature 210 or an artifact 212. For instance, the background 214 can correspond to an absence of the tissue sample in an image 120 having a tissue sample.

The image retriever 108 can receive, retrieve, or otherwise identify an image 120 from which to select one or more tiles 122. The image 120 can have a dimension. The dimension of the image 120 can correspond to the number of pixels in the image 120. For instance, the image 120 can have a first number of pixels in one dimension and a second number of pixels in a second dimensions, such as 1920 pixels in one dimension and 1080 pixels in the second dimension. For example, the image 120 may be a gigapixel image having thousands of pixels in each dimension. The image 120 can have an area corresponding to a presence of the feature 210. The area can be less than or equal to the dimension of the image 120. For instance, the feature 210A can correspond to the first area. The image 120 can have a second area corresponding to an absence of the feature 210A. The artifact 212A or the background 214A can correspond to the absence of the feature 210A.

The dimension reducer 110 can apply, use, or otherwise perform a reduction operation on the image 120 to generate a down-sampled image 202. The reduction operation can include down-sampling or dimension reduction. To down-sample, the dimension reducer 110 may apply a filter (e.g., a low-band frequency filter) to the image 120, and may select at preset coordinates (e.g., by decimation) to generate the down-sampled image 202. The dimension of the down-sampled image 204 can be less than the image 120. For example, the dimension of the down-sample image 204 relative to the original dimension of the image 120 can be proportional to the down-sampling rate in the reduction operation.

The dimension reducer 110 can then apply a discretization operation to the image 120 or the down-sampled image 202. The discretization operation can include a max-pooling operation, a min-pooling operation, an average pooling operation, among others. In some embodiments, the dimension reducer 110 applies the discretization operation prior to the dimension reduction operation or the thresholding operation. In applying the operation, the dimension reducer 110 may identify a plurality of segments from the image (e.g., the image 120 or the down-sampled image 202) based on a pooling factor. The segments may correspond to one of the tiles 122 to be extracted from the image 120, and the pooling factor may be proportional to the difference in dimension between the segment and the tile 122. For each segment, the dimension reducer 110 may determine a value (e.g., RGB value) based on the values of the pixels in the image corresponding to the segment. For example, in a max-pooling operation, the dimension reducer 110 may identify the highest value from the pixels. With the determination of the value for each segment, the dimension reducer 110 can generate an image of a smaller dimension than the original image 120. In some embodiments, the image generated from the discretization process may be lower than the down-sampled image 204.

With the reduction of the dimensions, the artifact suppressor 112 can reduce, subtract, or otherwise remove the artifacts 212A from the image 120 or artifact 212B from the down-sampled image 204. In some embodiments, the artifact suppressor 112 can perform a smoothening operation on the second image to reduce or eliminate at least one visual artifact 212B from the down-sampled image 204. The smoothening operation can include, for example, reducing noise, removing the artifact 212B, or producing a less pixelated image. The down-sampled image 204 (or the image 120) can be smoother by using an average or median value of a group of pixels (a kernel) that moves through the image. The smoothening operation can also include a low pass filtering the image to remove high spatial frequency noise from the image 204. The low-pass filters can include a window operator changing a value of each pixel by a local region of pixels. The artifact suppressor 112 can apply the smoothening operation to convert the down-sampled image 204 into the down-sample image without artifacts 212. In some embodiments, the artifact suppressor 112 may apply the smoothening operation or the removal of the artifact 212A or the artifact 212B prior to the tile selector 114 applying a thresholding operation.

In some embodiments, the artifact suppressor 112 identify detect a visual mark corresponding to the artifact 212A in the image 120 or the artifact 212B in the down-sampled image 204. In the case of a biomedical image for the image 120, the visual mark may correspond to, for example, a pen mark used for annotation, residual stains, and other noise. The detection may be based on at least one of a color characteristic of the visual mark or an area of the artifact 212A or the artifact 212B. In some embodiments, the artifact suppressor 112 may identify one or more pixels in an area of the down-sampled image 204 with red color, green color, and blue color (RGB) values different from the RGB values of one or more pixels of an adjacent area. The artifact suppressor 112 may determine a difference in the RGB values of the two areas, and may compare the difference to a threshold value. The threshold value may delineate a value for the difference in RGB values at which to determine the area as a visual mark. When the difference is greater than or equal to the threshold value, the artifact suppressor 112 may determine that the area is a visual mark. In addition, the artifact suppressor 112 may reduce, subtract, or remove the area corresponding to the visual mark in the image 120 or the down-sampled image 204. Otherwise, when the difference is less than the threshold value, the artifact suppressor 112 may determine that the area is not a visual mark.

The tile selector 114 can apply a thresholding operation on the down-sampled image without artifacts 212. The thresholding operation can include Otsu's method, a balanced histogram thresholding, or an adaptive thresholding. In some embodiments, Otsu's method can be used to threshold the image 120' to efficiently discard all background tiles 122, thus drastically reducing the amount of computation per slide. For example, Otsu's method can returns a single intensity threshold that separate pixels into two classes, foreground and background. This threshold is determined by minimizing intra-class intensity variance, or equivalently, by maximizing inter-class variance. Tiling can be performed at different magnification levels and with various levels of overlap between adjacent tiles 122.

Based on the thresholding operation, the tile selector 114 can identify a first set of pixels corresponding to the presence of the feature 210C and a second set of pixels corresponding to the absence of the feature 210C based on an intensity of each pixel in the down-sampled image without artifacts 212. For example, a pixel corresponding to the presence of the feature 210C may correspond to an intensity value of "1", whereas a pixel corresponding to the absence of the feature 210C may correspond to an intensity value of "0". The absence of the feature 210C can be the background 214C. By applying the thresholding operation to the down-sampled image without artifacts 212, the tile selector 114 can generate the thresholded image 206. The thresholded image 206 can have a first set of pixels correspond to the presence of the feature 210D and a second set of pixels corresponding to the absence of the feature. The absence of the feature 210D can be the background 214D.

Figure 3:
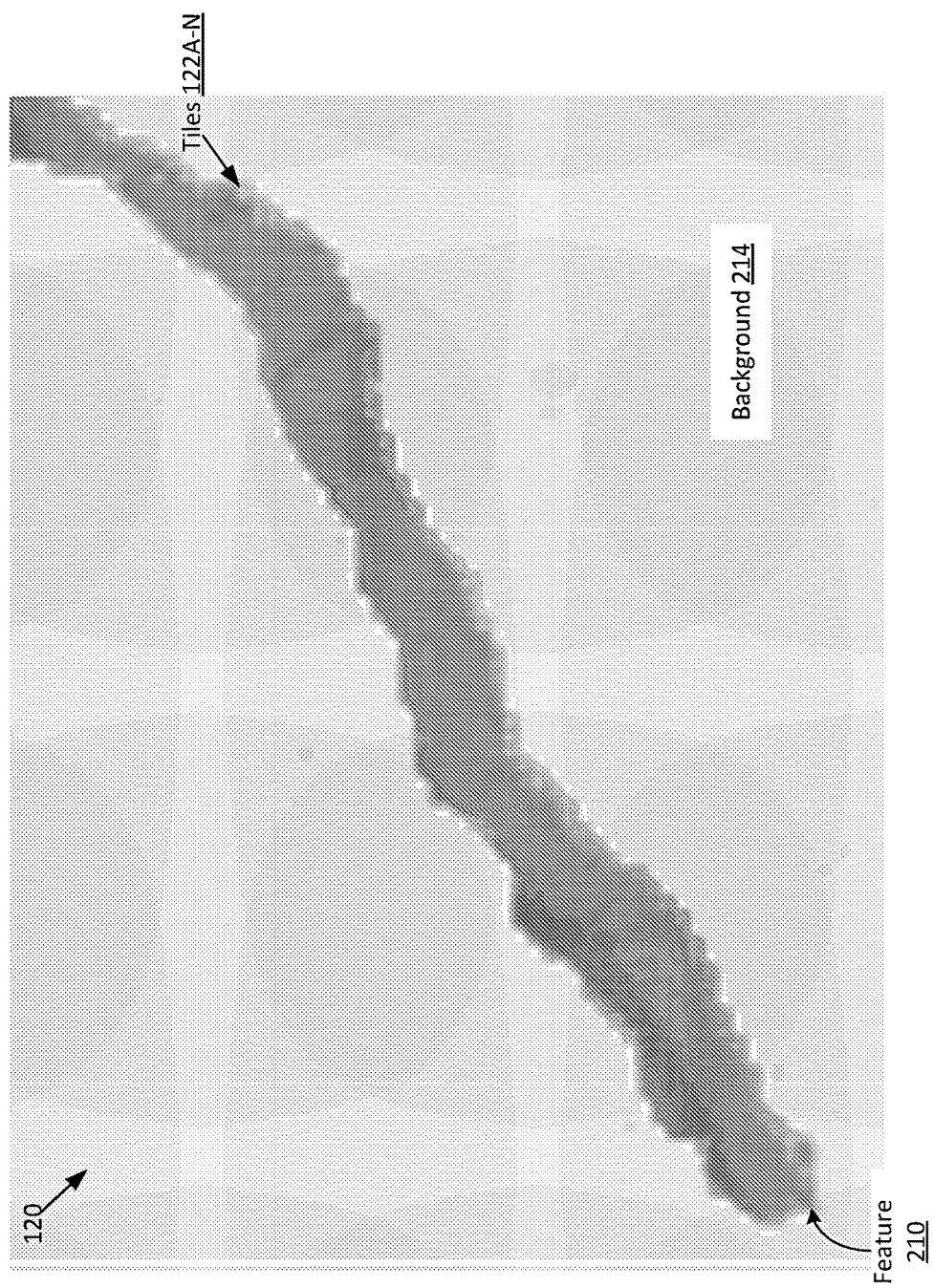
FIG. 3 depicts examples of tiles found at magnification with no overlap.

The tile selector 114 can also apply the thresholding operation to generate an image with the set of tiles 208 based on the thresholded image 206 in accordance with the thresholding operation. The image with tiles 208 can include the first set of pixels each set to a first value to indicate the presence of the feature 210E. The image with tiles 208 can also include the second set of pixels each set to a second value to indicate an absence of the feature 210E. The absence can be the background 214E. As depicted in FIG. 3, the image with tiles 208 can includes the feature 210 and background 214. The feature 210 is represented as a grid of tiles 122A-N. In some embodiments, the image 120 depicted in FIG. 3 is magnified 20 times. Based on the thresholded image 206, the tile selector 114 can select from a plurality of tiles 122 corresponding to the image 120, a subset of tiles 122A-D corresponding to the first set of pixels identified from the thresholded image 206.

Referring back to FIG. 2, and in further detail, the tile selector 114 can generate, extract, or identify a plurality of tiles 122 from the image 120 at a defined step size. Each tile 122 of the plurality of tiles 122A-N can correspond to a respective portion of the image 120. For instance, the tiles 122A-D can represent the portion of the image 120 having the feature 210. In particular, the tiles 122A-D can correspond to the pixels of the down sampled image 202, which correspond to the image 120. For instance, at least one pixel in the down-sampled image 202 can correspond to one of the tiles 122. The size of the title 122 corresponding to the pixel can be based on the down sampling rate. For instance, down sampling by a large factor will have the pixel correspond to a greater portion of the image 120, such as the entire feature 210. However, down sampling by a small factor will have the pixel correspond to a smaller portion of the image 120, such as less than a fourth of the feature 210 as depicted by each tile 122A-D in the image with tiles 208. For instance, one pixel in the down-sampled image 202 can correspond to a portion in the image 120 having 32 pixels by 32 pixels.

From the plurality of tiles 122, the tile selector 114 can select, generate, or extract the subset of tiles 122 (e.g., tiles 122 A-D as depicted. To select, the tile selector 114 may identify, for each of the subset of tiles 122, a corresponding set of coordinates defining a respective portion in the image 120. Each tile 122 of the subset of tiles 122 can correspond to one or more respective pixels of the set of pixels in the image 120. For instance, each tile 122 of the tiles 122 can correspond to a portion of feature 210A. To select the tiles 122, the tile selector 114 can determine, for each tile 122 of the subset of tiles 122, a mapping between one or more respective pixels of the first set of pixels identified from the image with tiles 208 to a respective portion in the image 120. The mapping can be based on a coordinate plane. For instance, each tile 122 of the tiles 122 can have a specific coordinates corresponding to the feature 210A in the image 120. The determination of the mapping can be based on the reduction operation used to generate the thresholded image 206.

The tile handler 116 can store, maintain, or record an association between the image 120 and the subset of tiles 122 in the database 118. In particular, the tile handler 116 can store, in the database 118, the mapping of each tile 122 of the subset of tiles 122 to each portion of the image 120. The tile handler 116 can store the image 120 to the database 118 as one of the images 120A-N. Similarly, the tile handler 116 can store the subset of tiles 122 to the database 118 as one of the tiles 122. The tile handler 116 can also store an association between the image 120 and the corresponding set of coordinates for each the subset of tiles 122. The coordinates can be based on the mapping of the tiles 122 to the image 120. For instance, the tile handler 116 can store data indicating that the tiles 122 correspond to the coordinates corresponding to the feature 210A in the image 120.

By storing the associations and coordinates between the image 120 and the tiles 122, the tile handler 116 can provide, identify, or transmit the subset of tiles corresponding to the image 120 based on the request received by the image retriever from the client device 104 as described herein. For instance, the tile handler 116 can receive a request to provide tiles 122 for an image 120. The tile handler 116 can provide some or all of the tiles of the image 120. In some embodiments, the tile handler 116 can provide the tiles 122 that correspond to the feature 210 of the image 120, or provide tiles 122 that correspond to the entire image 120. In some embodiments, the tile handler 116 may provide the image 120 along with the tiles 122 to the display 126. The display 126 may include any monitor, such as a liquid crystal display (LCD), an organic light-emitting diode (OLED) monitor, and a cathode ray tube (CRT), among others. The display 126 may be communicatively coupled with the image processing system 102, and may render and output the image from the image segmentation system 102.

Figure 4:
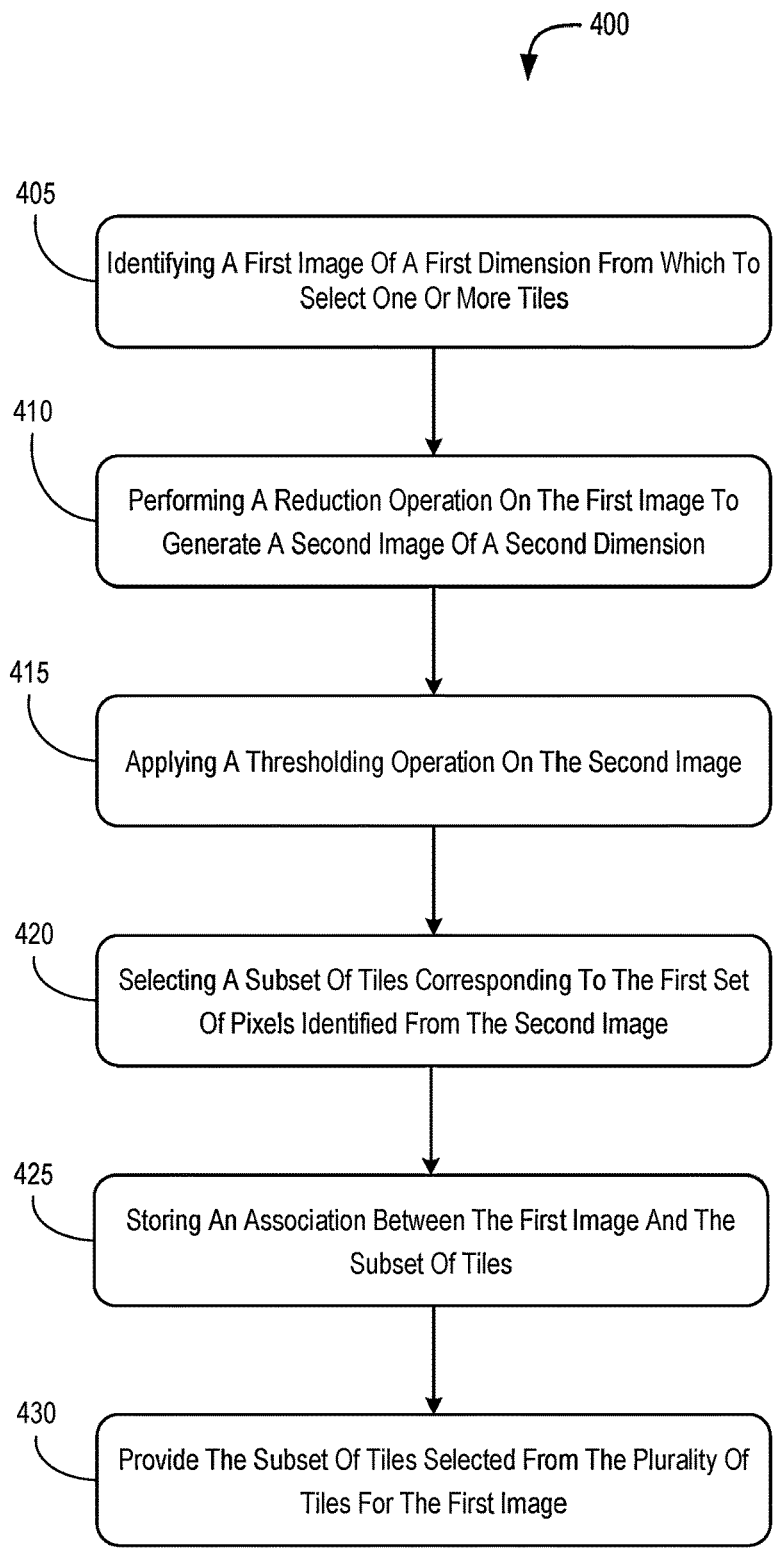
FIG. 4 depicts a flow diagram of a method of fast whole slide tissue tiling.

FIG. 4 depicts a flow diagram of a method 400 of semantic image retrieval. The method 400 may be implemented or performed by any of the components described herein in conjunction with FIGS. 1-4. In overview, a computing system (e.g., the image processing system 102) may identify a first image (e.g., the image 120) of a first dimension from which to select one or more tiles (e.g., the tiles 122) (405). The image 120 may have a first area corresponding to a presence of a feature (e.g., the feature 210) and a second area corresponding to an absence of the feature (e.g., the artifact 212 or the background 214). The computing system perform a reduction operation (e.g., the dimension reducer 110) on the first image (e.g., the image 120) to generate a second image of a second dimension (e.g., the down-sampled image 202) (410). The second dimension may be less than the first dimension (e.g., reducing the image 120 via down-sampling). The computing system may apply a thresholding operation on the second image (e.g., the down-sampled image 202) (415). The thresholding operation image can generate the down-sampled image without artifacts 2012. The thresholding operation can also identify a first set of pixels corresponding to the presence of the feature (e.g., the feature 210) and a second set of pixels corresponding to the absence of the feature (e.g., the artifact 212 or the background 214). The thresholding operation can identify the first set of pixels in the second set of pixels based on an intensity of each pixel in the second image (e.g., the down-sampled image 202). The computing system may select a subset of tiles (e.g., 122A-D) corresponding to the first set of pixels identified from the second image (e.g., the down-sampled image 202) (420). The tile selector 114 can map the first set of pixels and the tiles 122 based on coordinates. The computing system may store (e.g., in the database 118) an association between the first image (e.g., the image 120) and the subset of tiles (e.g., the tiles 122A-D) (425). The computing system may provide the subset of tiles (e.g., the tiles 122A-D) selected from the plurality of tiles (e.g., the tiles 122) for the first image (e.g. image 120) (430). For instance, the tile handler 116 can provide the tiles 122A-N and the association with the image 120 to the display 126 via the output 124.

B. Computing and Network Environment

Figure 5:
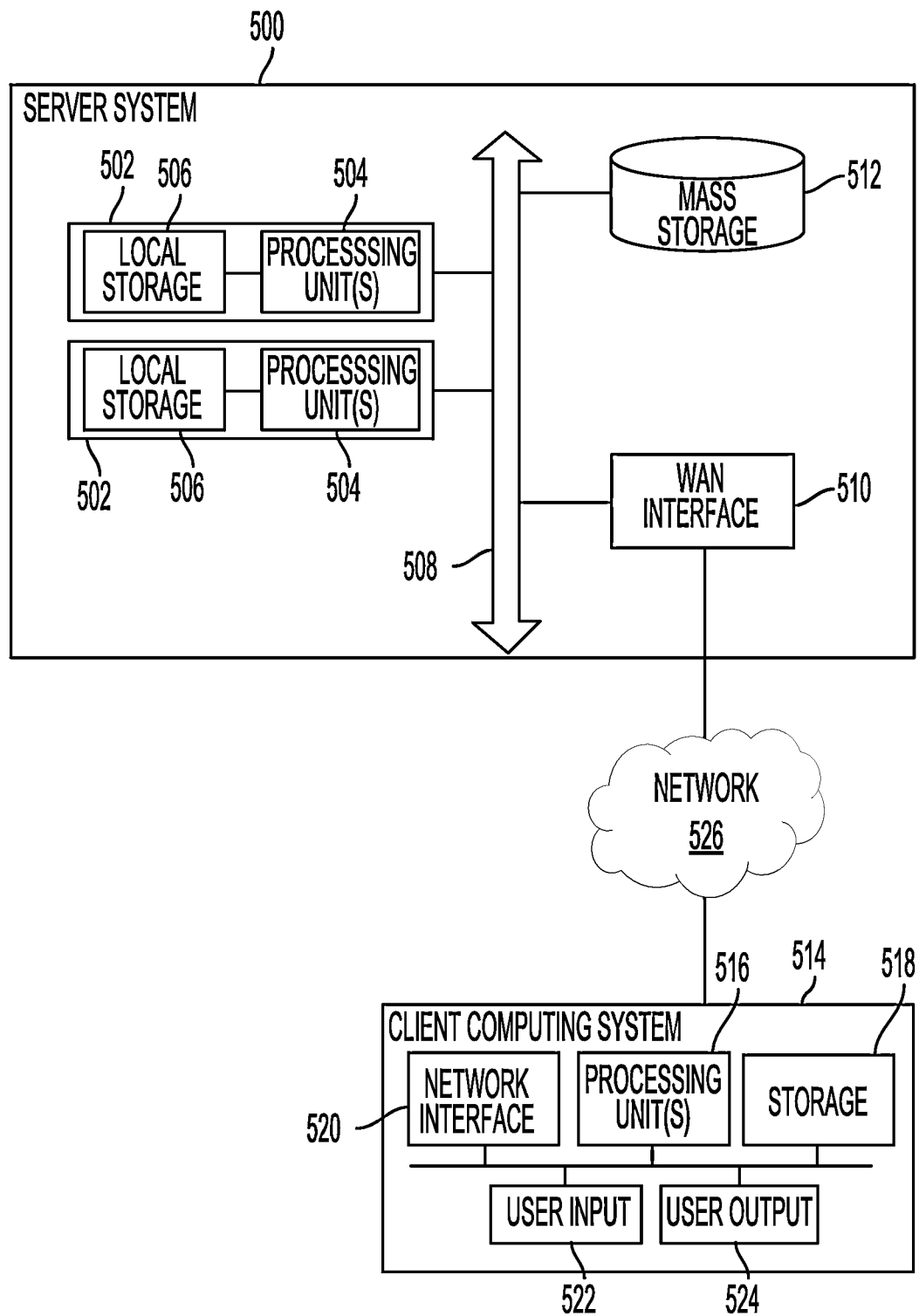
FIG. 5 depicts a block diagram of a server system and a client computer system in accordance with an illustrative embodiment.

Various operations described herein can be implemented on computer systems. FIG. 5 shows a simplified block diagram of a representative server system 500, client computer system 514, and network 526 usable to implement certain embodiments of the present disclosure. In various embodiments, server system 500 or similar systems can implement services or servers described herein or portions thereof. Client computer system 514 or similar systems can implement clients described herein. The system 100 described herein can be similar to the server system 500. Server system 500 can have a modular design that incorporates a number of modules 502 (e.g., blades in a blade server embodiment); while two modules 502 are shown, any number can be provided. Each module 502 can include processing unit(s) 504 and local storage 506.

Processing unit(s) 504 can include a single processor, which can have one or more cores, or multiple processors. In some embodiments, processing unit(s) 504 can include a general-purpose primary processor as well as one or more special-purpose co-processors such as graphics processors, digital signal processors, or the like. In some embodiments, some or all processing units 504 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 504 can execute instructions stored in local storage 506. Any type of processors in any combination can be included in processing unit(s) 504.

Local storage 506 can include volatile storage media (e.g., DRAM, SRAM, SDRAM, or the like) and/or non-volatile storage media (e.g., magnetic or optical disk, flash memory, or the like). Storage media incorporated in local storage 506 can be fixed, removable or upgradeable as desired. Local storage 506 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 504 need at runtime. The ROM can store static data and instructions that are needed by processing unit(s) 504. The permanent storage device can be a non-volatile read-and-write memory device that can store instructions and data even when module 502 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 506 can store one or more software programs to be executed by processing unit(s) 504, such as an operating system and/or programs implementing various server functions such as functions of the system 100 of FIG. 1 or any other system described herein, or any other server(s) associated with system 100 or any other system described herein.

"Software" refers generally to sequences of instructions that, when executed by processing unit(s) 504 cause server system 500 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 504. Software can be implemented as a single program or a collection of separate programs or program modules that interact as desired. From local storage 506 (or non-local storage described below), processing unit(s) 504 can retrieve program instructions to execute and data to process in order to execute various operations described above.

In some server systems 500, multiple modules 502 can be interconnected via a bus or other interconnect 508, forming a local area network that supports communication between modules 502 and other components of server system 500. Interconnect 508 can be implemented using various technologies including server racks, hubs, routers, etc.

A wide area network (WAN) interface 510 can provide data communication capability between the local area network (interconnect 508) and the network 526, such as the Internet. Technologies can be used, including wired (e.g., Ethernet, IEEE 802.3 standards) and/or wireless technologies (e.g., Wi-Fi, IEEE 802.11 standards).

In some embodiments, local storage 506 is intended to provide working memory for processing unit(s) 504, providing fast access to programs and/or data to be processed while reducing traffic on interconnect 508. Storage for larger quantities of data can be provided on the local area network by one or more mass storage subsystems 512 that can be connected to interconnect 508. Mass storage subsystem 512 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 512. In some embodiments, additional data storage resources may be accessible via WAN interface 510 (potentially with increased latency).

Server system 500 can operate in response to requests received via WAN interface 510. For example, one of modules 502 can implement a supervisory function and assign discrete tasks to other modules 502 in response to received requests. Work allocation techniques can be used. As requests are processed, results can be returned to the requester via WAN interface 510. Such operation can generally be automated. Further, in some embodiments, WAN interface 510 can connect multiple server systems 500 to each other, providing scalable systems capable of managing high volumes of activity. Other techniques for managing server systems and server farms (collections of server systems that cooperate) can be used, including dynamic resource allocation and reallocation.

Server system 500 can interact with various user-owned or user-operated devices via a wide-area network such as the Internet. An example of a user-operated device is shown in FIG. 13 as client computing system 514. Client computing system 514 can be implemented, for example, as a consumer device such as a smartphone, other mobile phone, tablet computer, wearable computing device (e.g., smart watch, eyeglasses), desktop computer, laptop computer, and so on.

For example, client computing system 514 can communicate via WAN interface 510. Client computing system 514 can include computer components such as processing unit(s) 516, storage device 518, network interface 520, user input device 522, and user output device 524. Client computing system 514 can be a computing device implemented in a variety of form factors, such as a desktop computer, laptop computer, tablet computer, smartphone, other mobile computing device, wearable computing device, or the like.

Processor 516 and storage device 518 can be similar to processing unit(s) 504 and local storage 506 described above. Suitable devices can be selected based on the demands to be placed on client computing system 514; for example, client computing system 514 can be implemented as a "thin" client with limited processing capability or as a high-powered computing device. Client computing system 514 can be provisioned with program code executable by processing unit(s) 516 to enable various interactions with server system 500.

Network interface 520 can provide a connection to the network 526, such as a wide area network (e.g., the Internet) to which WAN interface 510 of server system 500 is also connected. In various embodiments, network interface 520 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 522 can include any device (or devices) via which a user can provide signals to client computing system 514; client computing system 514 can interpret the signals as indicative of particular user requests or information. In various embodiments, user input device 522 can include any or all of a keyboard, touch pad, touch screen, mouse or other pointing device, scroll wheel, click wheel, dial, button, switch, keypad, microphone, and so on.

User output device 524 can include any device via which client computing system 514 can provide information to a user. For example, user output device 524 can include a display to display images generated by or delivered to client computing system 514. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that functions as both input and output device. In some embodiments, other user output devices 524 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 504 and 516 can provide various functionality for server system 500 and client computing system 514, including any of the functionality described herein as being performed by a server or client, or other functionality.

It will be appreciated that server system 500 and client computing system 514 are illustrative and that variations and modifications are possible. Computer systems used in connection with embodiments of the present disclosure can have other capabilities not specifically described here. Further, while server system 500 and client computing system 514 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. Embodiments of the disclosure can be realized using a variety of computer systems and communication technologies including but not limited to specific examples described herein. Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A method, comprising:
    identifying, by a computing system, a first image of a first dimension from which to select one or more tiles, the first image having a first area corresponding to a presence of a feature and a second area corresponding to an absence of the feature;
    performing, by the computing system, a reduction operation on the first image to generate a second image of a second dimension, the second dimension less than the first dimension;
    performing, by the computing system, a smoothening operation on the second image;
    after performing the smoothening operation on the second image, applying, by the computing system, a thresholding operation on the second image to identify a first set of pixels corresponding to the presence of the feature and a second set of pixels corresponding to the absence of the feature based on an intensity of each pixel in the second image;
    selecting, by the computing system, from a plurality of tiles corresponding to the first image, a subset of tiles corresponding to the first set of pixels identified from the second image; and
    storing, by the computing system, in one or more data structures, an association between the first image and the subset of tiles.

2. The method of claim 1, further comprising:
    receiving, by the computing system, a request for tiles from the first image to be used for additional processing; and
    providing, by the computing system, responsive to the request, the subset of tiles selected from the plurality of tiles for the first image.

3. The method of claim 1, further comprising removing, by the computing system, prior to applying the thresholding operation, a visual mark in at least one of the first image or the second image based on at least one of a color characteristic of the visual mark or an area of the visual mark.

4. The method of claim 1, wherein the smoothening operation on the second image reduces noise, reduces or eliminates at least one visual artifact, and/or produces a less pixelated image.

5. The method of claim 1, further comprising identifying, by the computing system, a plurality of tiles from the first image at a defined step size, each tile of the plurality of tiles corresponding to a respective portion of the first image, each tile of the subset of tiles corresponding to one or more respective pixels of the first set of pixels in the second image.

6. The method of claim 1, further comprising applying, by the computing system, a discretization operation to a third image generated from applying the threshold operation on the second image, the third image having the first set of pixels corresponding to the presence of the feature and the second set of pixels corresponding to the absence of the feature.

7. The method of claim 1, wherein applying the thresholding operation further comprises generating a third image using the second image in accordance with the thresholding operation, the third image having (i) the first set of pixels each set to a first value to indicate the presence of the feature and (ii) the second set of pixels each set to a second value to indicate an absence of the feature.

8. The method of claim 1, wherein selecting the subset of tiles further comprises determining, for each tile of the subset of tiles, a mapping between one or more respective pixels of the first set of pixels identified from the second image to a respective portion in the first image based on the reduction operation used to generate the second image.

9. The method of claim 1, wherein selecting the subset of tiles further comprises identifying, for each of the subset of tiles, a corresponding set of coordinates defining a respective portion in the first image; and further comprising:
wherein storing the association further comprises storing, in the one or more data structures, the association between the first image with the corresponding set of coordinates for each the subset of tiles.

10. The method of claim 1, wherein the first image is derived from a tissue sample via a histopathological image preparer, the feature corresponding to the tissue sample, the first image having the first area corresponding to a presence of the tissue sample and a second area corresponding to an absence of the tissue sample.

11. A system, comprising:
a computing system comprising one or more processors coupled with memory, configured to:
identify a first image of a first dimension from which to select one or more tiles, the first image having a first area corresponding to a presence of a feature and a second area corresponding to an absence of the feature;
perform a reduction operation on the first image to generate a second image of a second dimension, the second dimension less than the first dimension;
perform a smoothening operation on the second image;
after performing the smoothening operation on the second image, apply a thresholding operation on the second image to identify a first set of pixels corresponding to the presence of the feature and a second set of pixels corresponding to the absence of the feature based on an intensity of each pixel in the second image;
select from a plurality of tiles corresponding to the first image, a subset of tiles corresponding to the first set of pixels identified from the second image; and
store in one or more data structures, an association between the first image and the subset of tiles.

12. The system of claim 11, wherein the computing system is further configured to:
receive a request for tiles from the first image to be used for additional processing; and
provide responsive to the request, the subset of tiles selected from the plurality of tiles for the first image.

13. The system of claim 11, wherein the computing system is further configured to remove, prior to applying the thresholding operation, a visual mark in at least one of the first image or the second image based on at least one of a color characteristic of the visual mark or an area of the visual mark.

14. The system of claim 11, wherein the smoothening operation on the second image reduces noise, reduces or eliminates at least one visual artifact, and/or produces a less pixelated image.

15. The system of claim 11, wherein the computing system is further configured to identify a plurality of tiles from the first image at a defined step size, each tile of the plurality of tiles corresponding to a respective portion of the first image, each tile of the subset of tiles corresponding to one or more respective pixels of the first set of pixels in the second image.

16. The system of claim 11, wherein the computing system is further configured to apply a discretization operation to a third image generated from applying the threshold operation on the second image, the third image having the first set of pixels corresponding to the presence of the feature and the second set of pixels corresponding to the absence of the feature.

17. The system of claim 11, wherein applying the thresholding operation further comprises generating a third image using the second image in accordance with the thresholding operation, the third image having (i) the first set of pixels each set to a first value to indicate the presence of the feature and (ii) the second set of pixels each set to a second value to indicate an absence of the feature.

18. The system of claim 11, wherein selecting the subset of tiles further comprises determining, for each tile of the subset of tiles, a mapping between one or more respective pixels of the first set of pixels identified from the second image to a respective portion in the first image based on the reduction operation used to generate the second image.

19. The system of claim 11, wherein selecting the subset of tiles further comprises identifying, for each of the subset of tiles, a corresponding set of coordinates defining a respective portion in the first image; and
wherein storing the association further comprises storing, in the one or more data structures, the association between the first image with the corresponding set of coordinates for each the subset of tiles.

20. The system of claim 11, wherein the first image is derived from a tissue sample via a histopathological image preparer, the feature corresponding to the tissue sample, the first image having the first area corresponding to a presence of the tissue sample and a second area corresponding to an absence of the tissue sample.

* * * * *